US012714102B2

(12) United States Patent
Miesse et al.

(10) Patent No.: US 12,714,102 B2
(45) Date of Patent: Aug. 25, 2026

(54) USE OF DIAMINOMETHANAL CARBOXYLIC ACID COMPLEXES AS AGRICULTURAL SPRAY ADJUVANTS

(71) Applicant: HELENA AGRI-ENTERPRISES, LLC, Collierville, TN (US)

(72) Inventors: Katie W. Miesse, Memphis, TN (US); Emily Gum, Memphis, TN (US); Johnnie R. Roberts, Memphis, TN (US)

(73) Assignee: HELENA AGRI-ENTERPRISES, LLC, Collierville, TN (US)

( * ) Notice: Subject to any disclaimer, the term of this patent is extended or adjusted under 35 U.S.C. 154(b) by 0 days.

(21) Appl. No.: 17/703,243

(22) Filed: Mar. 24, 2022

(65) Prior Publication Data

US 2022/0312764 A1 Oct. 6, 2022

Related U.S. Application Data

(60) Provisional application No. 63/166,104, filed on Mar. 25, 2021.

(51) Int. Cl.

| | |
|---|---|
| ***A01N 33/08*** | (2006.01) |
| ***A01N 25/04*** | (2006.01) |
| ***A01N 25/30*** | (2006.01) |
| ***A01P 3/00*** | (2006.01) |
| ***A01P 7/04*** | (2006.01) |
| ***A01P 13/02*** | (2006.01) |
| ***C05C 9/00*** | (2006.01) |
| ***C05G 5/27*** | (2020.01) |

(52) U.S. Cl.

CPC ............ *A01N 33/08* (2013.01); *A01N 25/04* (2013.01); *A01N 25/30* (2013.01); *C05C 9/005* (2013.01); *C05G 5/27* (2020.02); *A01P 3/00* (2021.08); *A01P 7/04* (2021.08); *A01P 13/02* (2021.08)

(58) Field of Classification Search

CPC ........ A01N 33/08; A01N 25/04; A01N 25/30; A01N 37/02; A01N 47/34; A01P 3/00; A01P 7/04; A01P 13/02

See application file for complete search history.

(56) References Cited

U.S. PATENT DOCUMENTS

| | | | | |
|---|---|---|---|---|
| 5,178,795 | A | 1/1993 | Roberts | |
| 5,234,919 | A | 8/1993 | Roberts | |
| 5,393,791 | A | 2/1995 | Roberts | |
| 5,580,567 | A | 12/1996 | Roberts | |
| 5,725,630 | A | 3/1998 | Roberts et al. | |
| 5,741,502 | A | 4/1998 | Roberts | |
| 5,877,112 | A | 3/1999 | Roberts et al. | |
| 5,906,961 | A | 5/1999 | Roberts et al. | |
| 6,040,273 | A | 3/2000 | Dean | |
| 7,022,648 | B2 * | 4/2006 | Dean | A01N 47/34 47/57.6 |
| 8,580,709 | B2 * | 11/2013 | Haas | A01N 37/42 504/144 |
| 10,405,551 | B2 | 9/2019 | Sheth et al. | |
| 2007/0049498 | A1 * | 3/2007 | Brigance | A01N 25/30 504/365 |
| 2014/0230504 | A1 * | 8/2014 | Finlayson | C05F 17/939 435/252.9 |
| 2019/0008155 | A1 | 1/2019 | Sheth et al. | |
| 2019/0144350 | A1 * | 5/2019 | Fowles | A01N 59/06 71/28 |

FOREIGN PATENT DOCUMENTS

| | | | | |
|---|---|---|---|---|
| CN | 109627087 | A | * | 4/2019 |
| KR | 2014056547 | A | * | 5/2014 |

OTHER PUBLICATIONS

G. Navickaitė, R. Paleckiene, and A. M. Sviklas, "Interaction of Bioactive Material from Molasses with Urea", Cheminė Technologija, 2010, 2(55), 36-43. (Year: 2010).*

KR-2014056547-A machine translation (Year: 2014).*

CN-109627087-A machine translation (Year: 2019).*

N. K. Fageria, M. P. Barbosa Filho, A. Moreira and C. M. Guimaraes, "Foliar Fertilization of Crop Plants", Journal of Plant Nutrition, 32: 1044-1064, 2009. (Year: 2009).*

G. Navickaitė, R. Paleckiene, and A. M. Sviklas, "Interaction of Bioactive Material from Molasses with Urea", Cheminė Technologija, 2010, 2(55), 36-43, PTO translation. (Year: 2010).*

* cited by examiner

*Primary Examiner* — Mina Haghighatian
*Assistant Examiner* — Nathan W Schlientz
(74) *Attorney, Agent, or Firm* — Faegre Drinker Biddle & Reath LLP

(57) ABSTRACT

A composition containing diaminomethanal complexes with $C_1$ to $C_3$ carboxylic acids. The composition can be made into a solution by adding water. The solution can be applied to plants and/or soil.

19 Claims, 23 Drawing Sheets

Numbers within bars indicate the percent increase in efficacy compared to the herbicide without an adjuvant.

Numbers within bars indicate the percent increase in efficacy compared to the herbicide without an adjuvant.

Numbers within bars indicate the percent increase in efficacy compared to the herbicide without an adjuvant.

Velvetleaf Control

Numbers within bars indicate the percent increase in efficacy compared to the herbicide without an adjuvant.

Numbers within bars indicate the percent increase in efficacy compared to the herbicide without an adjuvant.

Numbers within bars indicate the percent increase in efficacy compared to the herbicide without an adjuvant.

Numbers within bars indicate the percent increase in efficacy compared to the herbicide without an adjuvant.

Adult Whitefly Count

Numbers within bars indicate the percent reduction of pests compared to the pesticide without an adjuvant.

Botrytis Infested Fruit

7 Days After First Application

Numbers within bars indicate the percent reduction of pests compared to the pesticide without an adjuvant.

Batrytis Infested Fruit

5 Days After Second Application

Numbers within bars indicate the percent reduction of pests compared to the pesticide without an adjuvant.

Numbers within bars indicate the percent reduction of pests compared to the pesticide without an adjuvant.

Numbers within bars indicate the percent increase of open bolls compared to the defoliant without an adjuvant.

Open Bolls

Numbers within bars indicate the percent increase of open bolls compared to the defoliant without an adjuvant.

Numbers within bars indicate the percent increase of open bolls compared to the defoliant and plant growth regulator without an adjuvant.

USE OF DIAMINOMETHANAL CARBOXYLIC ACID COMPLEXES AS AGRICULTURAL SPRAY ADJUVANTS

CROSS-REFERENCE TO RELATED APPLICATIONS

This application claims benefit to U.S. Provisional application No. 63/166,104 filed Mar. 25, 2021 which is incorporated by reference in its entirety.

BACKGROUND OF THE INVENTION

Spray adjuvants are materials added to pesticides for the purpose of improving their efficacy or correcting spray application problems. 1-aminomethanamide dihydrogen tetraoxosulfate (AMADS) is such an adjuvant component having been used commercially for a number of years. There are well established limitations, however, associated with the use of AMADS for this purpose. These limitations include corrosivity, worker safety, compatibility, and cold temperature stability. We have surprisingly found that another type of aminomethanamide complex combined with a specific category of surfactants may also be used as a spray adjuvant.

U.S. Pat. No. 6,040,273 ('273 patent) relates to compositions of matter comprising the reaction products of a carboxylic acid and a urea having the formula

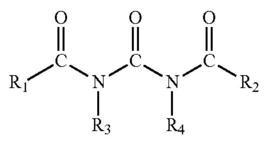

where $R_1$, $R_2$, $R_3$ and $R_4$ are the same or different and are selected from the group consisting of hydrogen, substituted and unsubstituted alkyl, allyl, vinyl and alkoxyl groups having from 1-6 carbon atoms, substituted and unsubstituted phenyl groups and the halides. Preferably, the reaction product of the present invention is N,N'-diformylurea or N,N'-diacetylurea. These reaction products, e.g., diformylurea, have been found to produce significantly improved growth in a variety of agricultural products when applied to the seed, to the surrounding soil or to the foliage of the emerging plant. Because of the similarity in the carbon, nitrogen, oxygen structure of these reaction products with many biological compounds, it is believed that the reaction products of the present invention may find use in a variety of biological applications.

U.S. Pat. No. 10,405,551 describes an agricultural formula including at least one diacyl or diaryl urea, such as a N,N'-diformylurea, and at least metal complex, such as metal complexes of cobalt, nickel, silver or other metals, is applied to plants at physiologically sensitive times resulting in prolonged and complete ethylene reduction. This synergistic agricultural formula gives those skilled in the art the ability to regulate important phenotypical parameters that lead to a variety of important agronomic and horticulture traits which improve crop yield parameters leading beyond that of its individual components.

U.S. Publication No. 2019/0008155 discloses diacyl or diacyl urea being used in conjunction with a plant growth regulator. The plant growth regulator is required.

SUMMARY OF THE INVENTION

This new approach is based on diaminomethanal complexes with $C_1$ to $C_3$ carboxylic acids. Inorganic acids could be used in place of organic acids, as in AMADS, but are not preferred for this composition. The preferred composition utilizes diaminomethanalethanoate complexes (DAMALEX), which we have discovered addresses many of the limitations presented by the traditional AMADS-based adjuvants referred to earlier.

The complexes are prepared by mixing diaminomethanal (CAS #57-13-6)

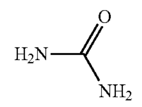

directly with $C_1$ to $C_3$ carboxylic acids in a water solution. The carboxylic acid to diaminomethanal ratio by weight % ranges from 90%-10% to 10%-90% with the preferred ratio being about 75% carboxylic acid to about 25% diaminomethanal or a ratio by weight % being about 50% carboxylic acid to about 50% diaminomethanal. A wide range of associations are likely created in the complex depending on variations in these ratios.

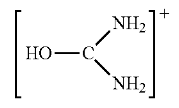

Diaminomethanal

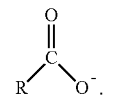

Carboxylate (R = $C_1$-$C_3$)

The invention also relates to using the composition with herbicides, fungicides, insecticides, defoliants, adjuvants, fertilizer and plant regulators. The composition can also be practiced without a plant regulator.

The invention may be applied to the soil surrounding the seed and/or emerging plant. When so applied, it is suggested that the solution be applied at a rate of about 1-100 grams of diformylurea or other reaction product per acre. Still another alternative is the application of such an aqueous solution to the foliage of the plant, preferably at the three leaf growth stage, at a rate of about 1-100 grams of diformylurea or other reaction product per acre. When applied to the foliage, those skilled in the art may include a conventional vegetable oil and surfactant in the solution to improve the retention of the active ingredient on the plant surfaces so that it may be more readily absorbed.

Embodiment 1 of the invention is a composition comprising water and diaminomethanal complexes with $C_1$ to $C_3$ carboxylic acids wherein the carboxylic acid to diaminomethanal ratio by weight % ranges from 90%-10% to 10%-90%.

Embodiment 2 of the invention is the composition of the embodiment 1, which further comprises a surfactant.

Embodiment 3 of the invention is the composition of the embodiment of 2, wherein the surfactant is present in an amount from 5 to 50% by weight.

Embodiment 4 of the invention is the composition of the embodiment of 2 or 3, wherein the surfactant is present in an amount from 5 to 20% by weight.

Embodiment 5 of the invention is the composition of the embodiment 2, 3, or 4 wherein the surfactant is fatty amine alkoxylate.

Embodiment 6 of the invention is the composition of the embodiment of 2, 3, 4 or 5, wherein the surfactant is fatty amine is selected from the formula

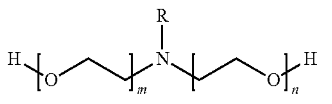

wherein R is the fatty amine group containing from 8 to 22 carbon atoms and moles of alkoxylation (m+n) are 5-20.

Embodiment 7 of the invention is the composition of any of the embodiments of 1 to 6 which further comprises a further a corrosion inhibitor.

Embodiment 8 of the invention is the composition of any of the embodiments 1 to 7, wherein with the ratio being about 70 to 80% carboxylic acid to about 20 to 30% diaminomethanal.

Embodiment 9 of the invention is the composition of any of the embodiments 1 to 8, wherein with the ratio being about 75% carboxylic acid to about 25% diaminomethanal.

Embodiment 10 of the invention is the composition of any of the embodiments 1 to 8, wherein with the ratio being about 50% carboxylic acid to about 50% diaminomethanal.

Embodiment 11 of the invention is the composition of any of the embodiments 1 to 10, wherein the carboxylic acid is C2.

Embodiment 12 of the invention is the composition of any of the embodiments 1 to 11, wherein the composition does not contain a plant regulator.

Embodiment 13 of the invention is a process to produce diaminomethanal complexes which comprises mixing diaminomethanal with C1 to C3 carboxylic acids in a water solution and the carboxylic acid to diaminomethanal is in a molar ratio ranges from 1:9 to 9:1.

Embodiment 14 of the invention is the process of the embodiment 13, wherein the ratio of the carboxylic acid to diaminomethanal molar ratio ranges from about 3:1.

Embodiment 15 of the invention is a fungicide comprising the composition as in any of the embodiments 1-12.

Embodiment 16 of the invention is an insecticide comprising the composition as in any of the embodiments 1-12.

Embodiment 17 of the invention is a herbicide comprising the composition as in any of the embodiments 1-12.

Embodiment 18 of the invention is a fertilizer comprising the composition as in any of the embodiments 1-12.

Embodiment 19 of the invention is a process to treat a plant which comprises applying the composition as in any of the embodiments 1-12 to the soil.

Embodiment 20 of the invention is a process to treat a plant which comprises applying the composition as in any of the embodiments 1-12 to the plant's surface.

Embodiment 21 of the invention is the process of embodiment of 19 or 20, wherein the solution is applied by spraying.

Embodiment 22 of the invention is the process of embodiments of 19 or 20, wherein the solution is applied at a rate of about 1-100 grams of diaminomethanal complexes with C1 to C3 carboxylic acids.

Embodiment 23 of the invention is a spray adjuvant comprising the composition as claimed in claim 1, and at least one component selected from the group consisting of:

(a) vegetable oils;

(b) fatty acids and blends thereof;

(c) esterified fatty acids or blends thereof;

(d) saponified fatty acids or blends thereof;

(e) N,N-dimethylamide of the formula

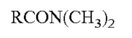

wherein R is an alkyl chain derived from fatty acids having about 6 to about 18 carbon atoms;

(f) polybutenes of the following formula

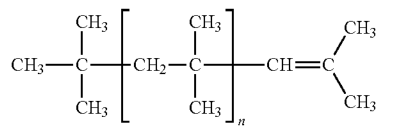

where n is a number from about 1 to about 50;

(g) spray oils having an UR value from about 85% to 100;

(h) surfactants;

(i) buffering agents; or (j) a mixture of (a)-(i).

Embodiment 24 of the invention is a spray adjuvant comprising the composition as in any of embodiments 1-12 and a surfactant in an effective amount to provide emulsification of said composition and optionally a buffering agent in an amount sufficient to reduce the pH to below about 7.

Embodiment 25 of the invention is a spray adjuvant of embodiment 23 comprising at least one component (a)-(g) and a surfactant in an effective amount to provide emulsification of said composition and optionally a buffering agent in an amount sufficient to reduce the pH to below about 7.

A BRIEF DESCRIPTION OF THE FIGURES

Figure 10:
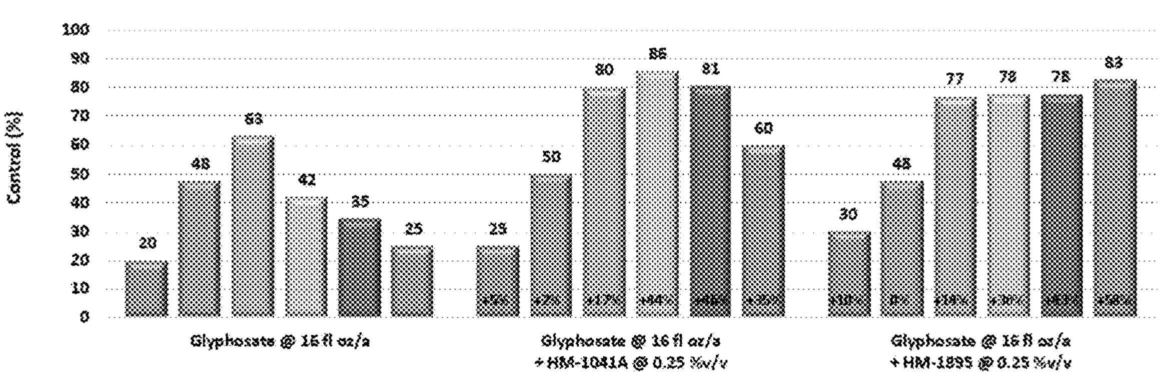
Figure 11:
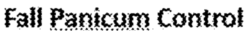
Figure 11:
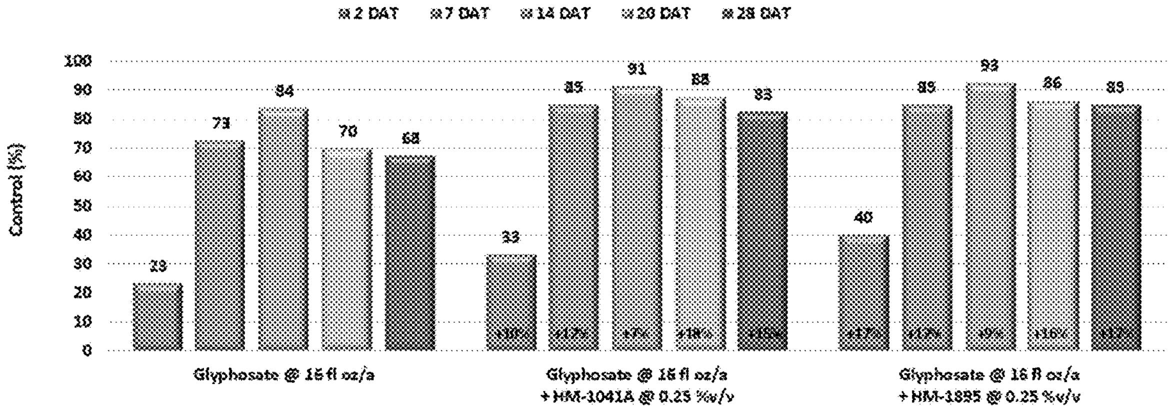
Figure 12:
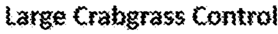
Figure 12:
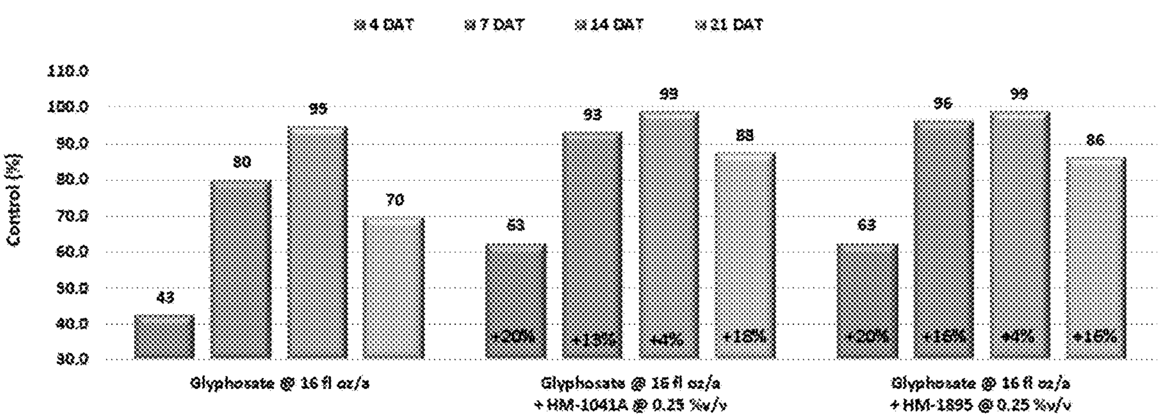
Figure 13:
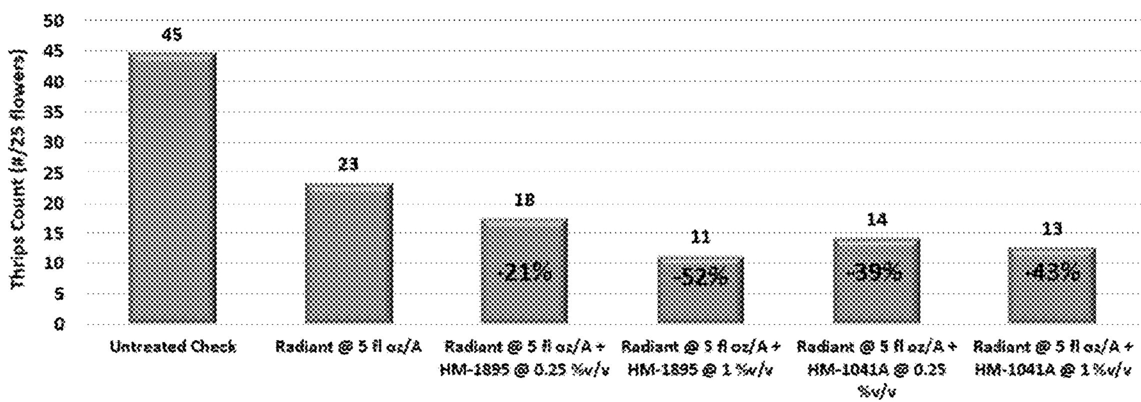
Figure 14:
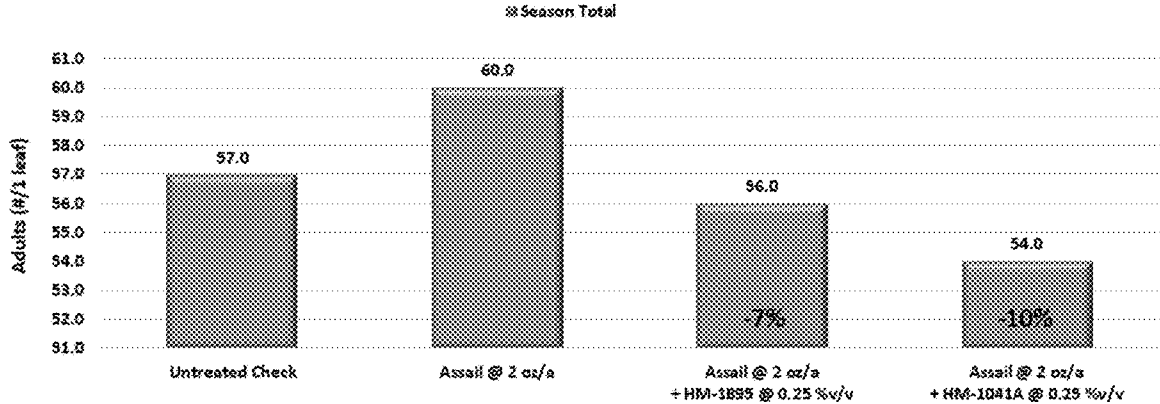
Figure 15:
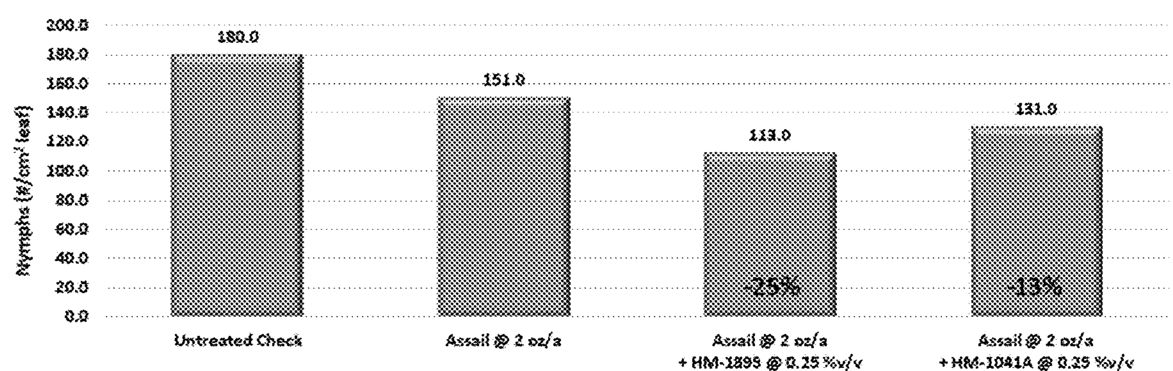
Figure 16:
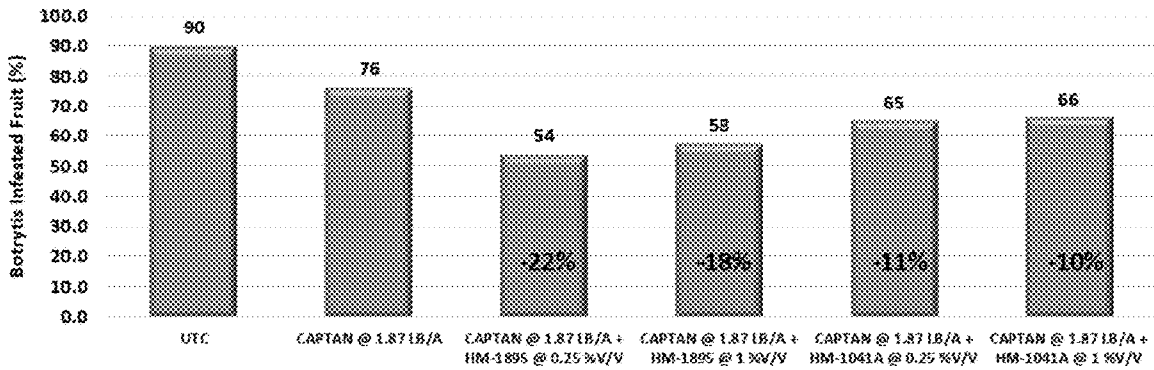
Figure 17:
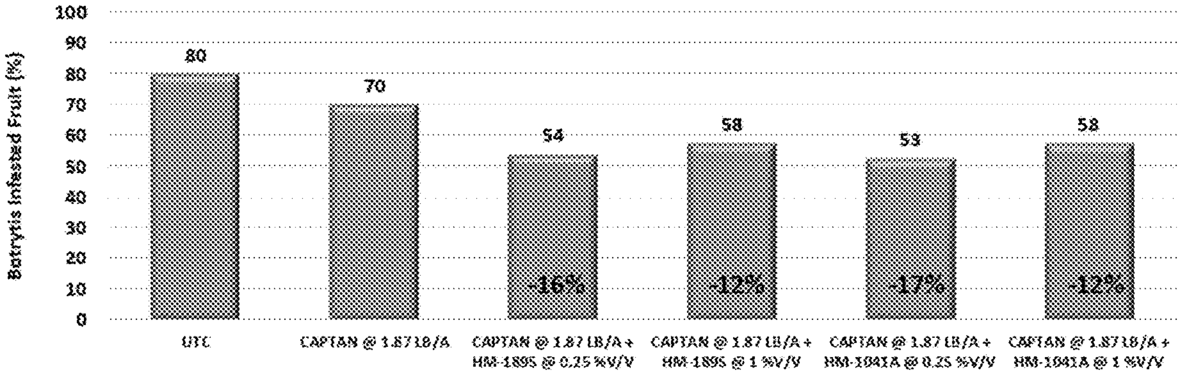
Figure 18:
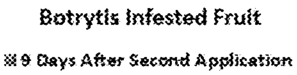
Figure 18:
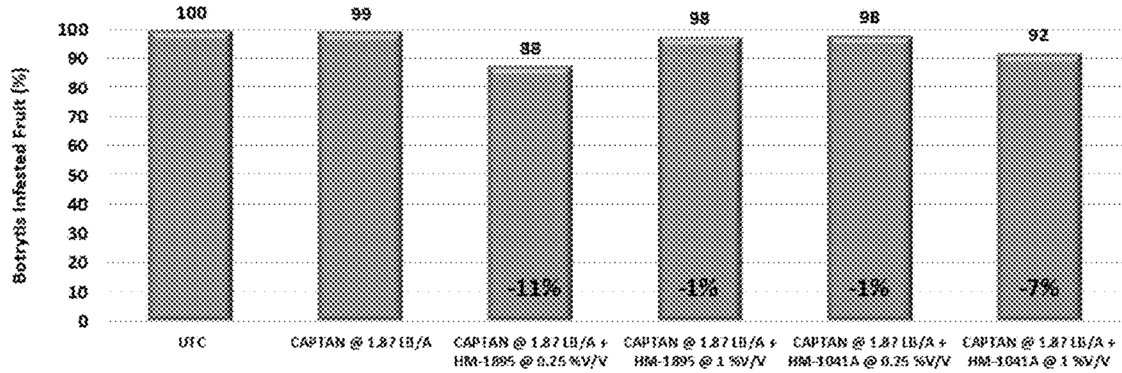
Figure 19:
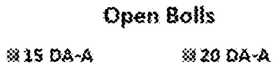
Figure 19:
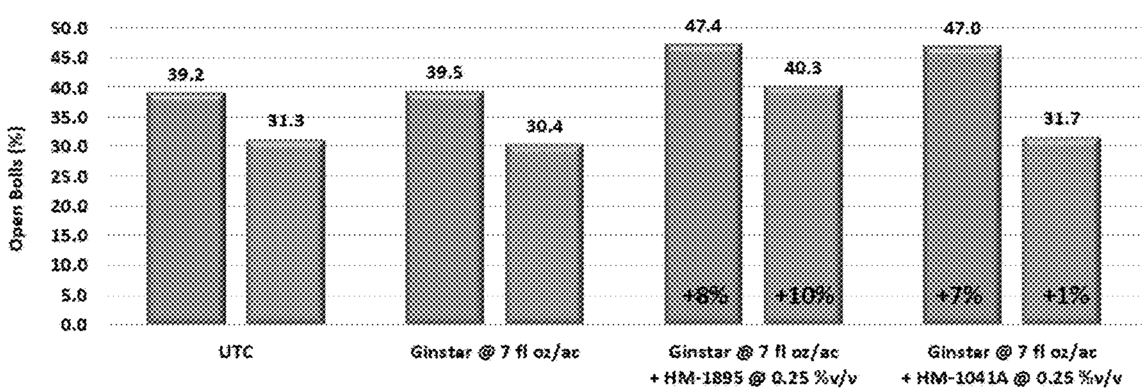
Figure 20:
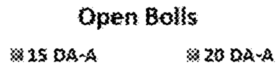
Figure 20:
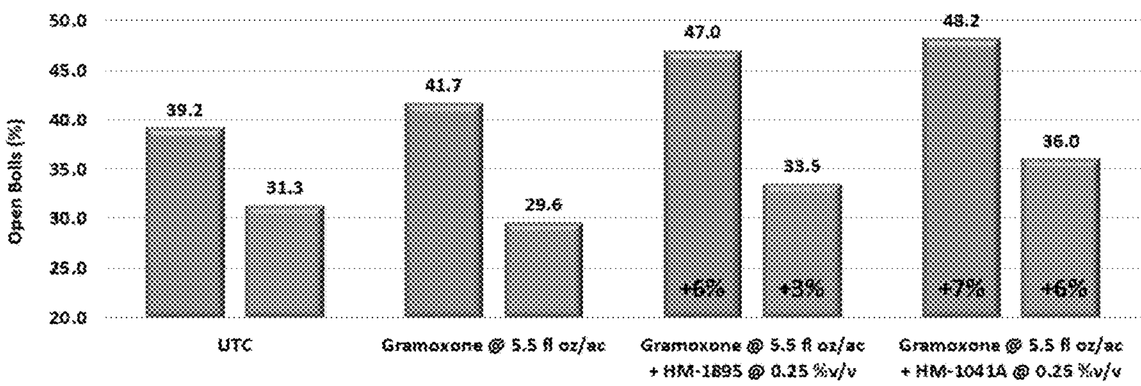
Figure 21:
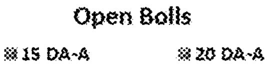
Figure 21:
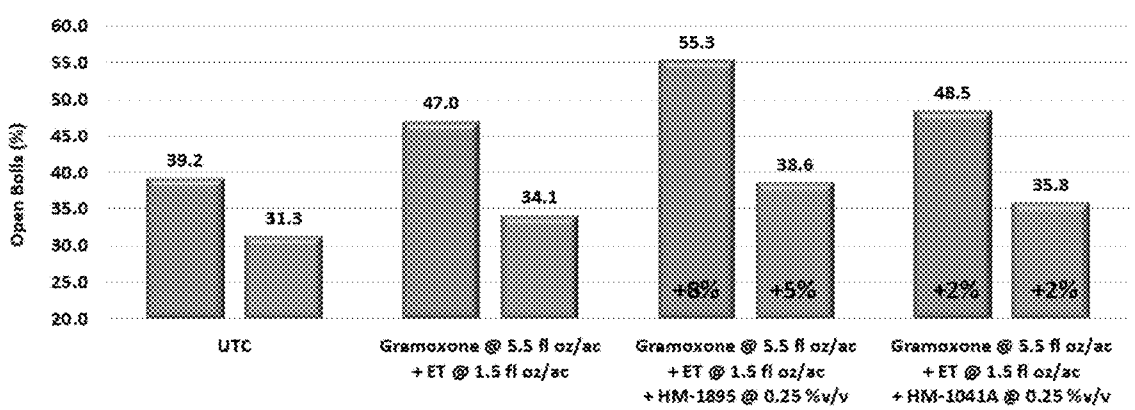
Figure 22:
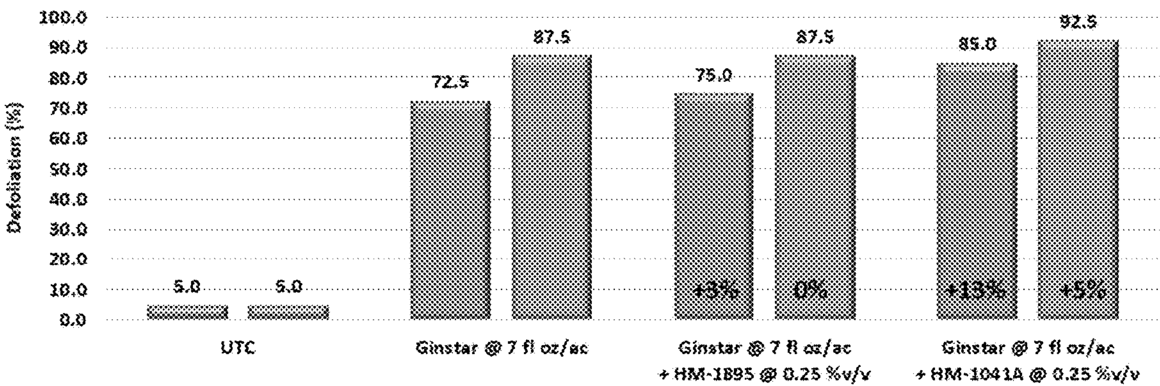
Figure 23:
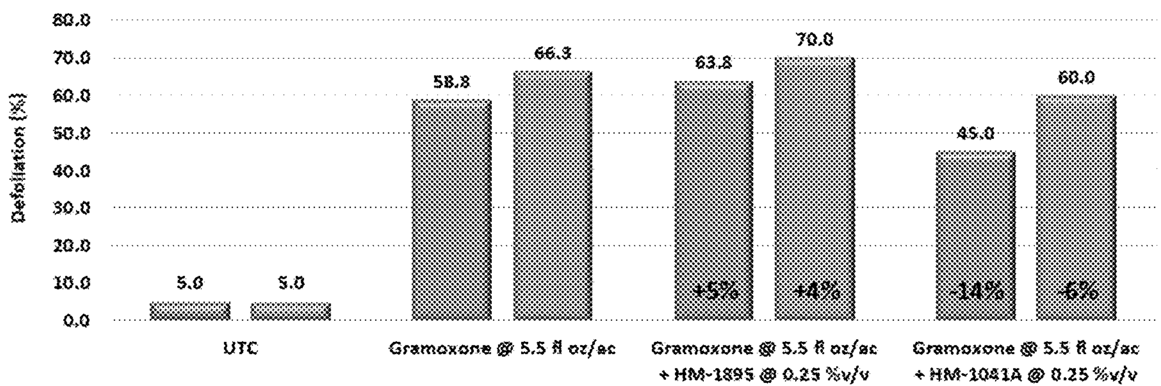

FIG. 10 illustrates field trial information for Common Lambsquarters Control FIG. 11 illustrates field trial information for Fall *Panicum* Control FIG. 12 illustrates field trial information for Large Crabgrass Control FIG. 13 illustrates field trial information for Immature *Thrips* Control FIG. 14 illustrates field trial information for Adult Whitefly Count FIG. 15 illustrates field trial information for Nymph Whitefly Count FIG. 16 illustrates field trial information for *Botrytis* Infested Fruit 7 Days After First Application FIG. 17 illustrates field trial information for *Botrytis* Infested Fruit 5 Days After Second Application FIG. 18 illustrates field trial information for *Botrytis* Infested Fruit 9 Days After Second Application FIG. 19-21 illustrates field trial information for Open Bolls FIG. 22-23 illustrates field trial information for Defoliation

A DETAILED DESCRIPTION OF THE INVENTION

The complexes are prepared by mixing diaminomethanal (CAS #57-13-6)

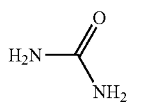

directly with $C_1$ to $C_3$ carboxylic acids in a water solution. The carboxylic acid to diaminomethanal ratio by weight % ranges from 90 to 10% which includes all the numbers between: 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11 or 10% to 10%-90% including all the numbers there between and any of the decimals there between. This would include about 70 to 80% carboxylic acid to about 20 to 30% diaminomethanal and the ratio being about 75% carboxylic acid to about 25% diaminomethanal. Also included is the ratio being about 50% carboxylic acid to about 50% diaminomethanal.

A wide range of associations are likely created in the complex depending on variations in these ratios.

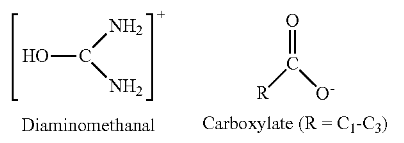

Diaminomethanal Carboxylate ($R = C_1$-$C_3$)

We have found that when using a combination of these components, valuable advantages are provided to fungicides, insecticides, and herbicides when they are applied in a spray application.

The following optional ingredients can be included in the composition: surfactants, corrosion inhibitors, pH reducer, macronutrients, micronutrients, buffers, crystallization inhibitors, viscosity modifiers, suspending agents, dyes, anti-oxidants, foaming agents, light absorbers, mixing auxiliaries, antifoams, complexing agents, neutralizing or pH-modifying substances and fragrances, wetting agents, take-up enhancers, dispersants, thickeners, antifreezes or microbicides.

The optional ingredients can be present in an effective amount up to 50% weight. Up to 50% includes 1, 2, 3, 4, 5, 6, 7, 8, 9, 10, 11, 12, 13, 14, 15, 16, 17, 18, 19, 21, 22, 23, 24, 25, 26, 27, 28, 29, 30, 31, 32, 33, 34, 35, 36, 37, 38, 39, 40, 41, 42, 43, 44, 45, 46, 47, 48, 49 and 50% by weight. This would also include decimal points between these numbers.

If a surfactant is present it must be present in an effective amount, preferably 5, 6, 7, 8, 9, 10, 11, 12, 13, 14, 15, 16, 17, 18, 10, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 and 50% by weight. Surfactants include but are not limited to:

a) fatty amine alkoxylate, preferably selected from the formula

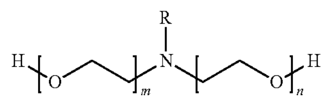

wherein R is the fatty amine group containing from 8 to 22 carbon atoms and moles of alkoxylation (m+n) are 5-20, where the range 5 to 20 includes 5, 6, 7, 8, 9, 10, 11, 12, 13, 14, 15, 16, 17, 18, 19 and 20, b) sorbitan fatty acid ester, c) polyethoxylated derivative of a sorbitan fatty acid ester, d) fatty alkanolamides of the formula

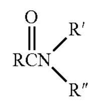

wherein R is an alkyl group having about 6 to about 25 carbon atoms; R' and R" independently of one another are selected from the group consisting of hydrogen, $—CH_2CH_2OH$ or

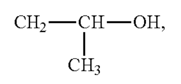

e) peg esters of the formula

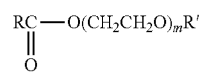

wherein R is a fatty alkyl having from about 2 to about 25 carbon atoms, R' is a fatty alkyl having from about 2 to about 25 carbon atoms or H and m is a number from 1 to about 100, f) silicone surfactants of the formula

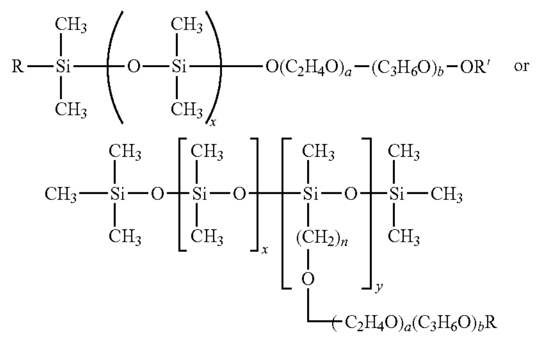

wherein R and R' independently from one another are hydrogen, alkyl having from 1 to about 20 carbon atoms, preferably 1 to 4 carbon atoms or an alkyl ester group having 1 to 20 carbon atoms, preferably 1 to 4 carbon atoms, x is a number from about 1 to about 100, preferably from about 1 to about 5, y is a number from about 1 to about 5, a is a number from about 3 to about 25, b is a number from about 0 to about 25, n is a number from about 2 to about 4 and g) ethoxylated fatty acids

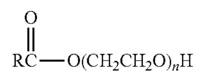

wherein R is an alkyl group having from about 6 to about 25 carbon atoms, n is a number from 1 to about 100, h) alkyl ethoxylates

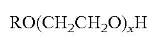

wherein R is an alkyl group having from about 1 to about 50 carbon atoms and x is a number from 1 to about 100, i) alkylphenol ethoxylates

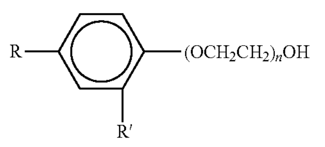

wherein R is H or an alkyl having from about 1 to about 20 carbons, R' is H or an alkyl having from about 1 to about 20 carbons and n is a number from 1 to about 100, j) polypropylene glycols

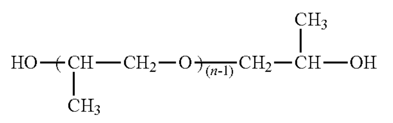

wherein n is a number from 1 to about 100, k) tristyrylphenol alkoxylates, l) amine ethoxylates

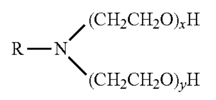

wherein x and y independently of one another are a number from about 1 to about 100 and R is an alkyl having from 1 to about 25 carbon atoms, m) N-Acyl Sarcosines and Sodium N-Acyl Sarcosinates, n) alkylaryl polyethoxy phosphate ester, o) alkylaryl polyethoxy carboxylate ester, p) tristyrylphenol alkoxylate phosphate esters, q) tristyrylphenol alkoxylate carboxylate esters, r) Phosphate esters of block copolymers of ethylene and propylene oxide or s) alkylpolyglucosides.

Corrosion inhibitors include, but are not limited to 1,3 Diethylthiourea (DTU), N,N-Diemthylthiourea (DMTU), Phenylthiourea (PTU) and Laurhydrazide N-propanone.

A pH reducer can be used to lower the pH of the composition. The pH reducer can be any acid such as an organic acid, such as but not limited to citric acid or carboxylic acid or Essence 6 from Helena Agri-Enterprises LLC (Helena). Essence 6 is a concentrated organic acid complex. Its low pH, clear amber liquid formulation will also clear drip irrigation lines. Essence 6 contains Helena's NutrAsyst Formulation Technology (NFT), a high-quality blend of organic acids that is designed to improve the performance of liquid fertilizers. About 2 quarts per acre.

The composition can contain micronutrients such as, but not limited to a water-soluble salt of boron, iron, manganese, magnesium, copper or zinc.

The inventive composition can also be used in an adjuvant in a fertilizer composition.

An adjuvant composition can comprise:

a composition comprising water and diaminomethanal complexes with $C_1$ to $C_3$ carboxylic acids wherein the carboxylic acid to diaminomethanal ratio by weight % ranges from 90%-10% to 10%-90%, and at least one component selected from the group consisting of:

(a) vegetable oils;

(b) fatty acids and blends thereof;

(c) esterified fatty acids or blends thereof;

(d) saponified fatty acids or blends thereof;

(e) N,N-dimethylamide of the formula

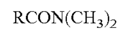

wherein R is an alkyl chain derived from fatty acids having about 6 to about 18 carbon atoms;

(f) polybutenes of the following formula

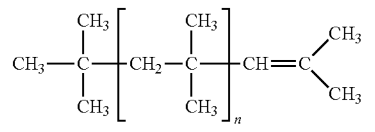

where n is a number from about 1 to about 50;

(g) spray oils having a unsulfonated residence (UR) value from about 85% to 100;

(h) surfactants;

(i) buffering agents; or (j) a mixture of (a)-(i).

The at least one component can be a surfactant in an effective amount to provide emulsification of said composition and optionally a buffering agent in an amount sufficient to reduce the pH to below about 7.

The spray adjuvant comprising the composition as claimed in claim 1 and a surfactant in an effective amount to provide emulsification of said composition and optionally a buffering agent in an amount sufficient to reduce the pH to below about 7.

The buffering function could be performed by some of the oil or surfactant components.

The spray oils utilized in this composition do not need to have an UR value and include at least one of the following:

1. Vegetable oils:

Such as, but not limited to vegetable seed oil or a mixture of vegetable seed oils, as they are known in the agricultural industry, crop seed oils which are produced from the particular crop from which their name is derived. Included in the vegetable oils suitable for the compositions of the present invention are cotton seed oil, canola, rapeseed, peanut oil, sunflower oil, linseed oil, safflower oil, soybean oil, corn oil, olive oil, coconut oil, tall oil or other seed oils and blends of the above oils such as cotton seed oil plus soybean oil; cotton seed oil plus peanut oil; cotton seed oil plus olive oil; corn oil plus linseed oil; corn oil plus soybean oil; as well as blends of any two or more of the above disclosed vegetable oils. The vegetable oils can be present in an amount from about 1 to about 99%, preferably from about 50 to about 99% and most preferably from about 80 to about 99%.

2. Fatty Acids and Blends Thereof:

Such as, but not limited to saturated and unsaturated fatty acids of about 6 to about 18 carbon atoms. The fatty acids and blends can be present in an amount from about 1 to about 99%, preferably from about 50 to about 99% and most preferably from about 80 to about 99%. The fatty acids can be used without a buffering agent when they reduce the pH of the solution to about 7 or below. The fatty acids can be used without a buffering agent when they reduce the pH to below about 7.

3. Esterified Fatty Acids or Blends Thereof:

Such as, but not limited to saturated and unsaturated esters of about 6 to about 18 carbon atoms. The esterified fatty acids can be present in an amount from about 1 to about 99%, preferably from about 50 to about 99% and most preferably from about 50 to about 80%. The esterified fatty acids may also be derived from any of the vegetable oils previously mentioned.

The esterified fatty acids can be used without a buffering agent when they reduce the pH of the solution to about 7 or below. The esterified fatty acids can be used without a buffering agent when they reduce the pH to below about 7.

4. Saponified Fatty Acids or Blends Thereof:

Such as, but not limited to saturated and unsaturated soaps of about 6 to about 18 carbon atoms. The saponified fatty acids can be present in an amount from about 1 to about 99%, preferably from about 50 to about 99% and most preferably from about 50 to about 80%. The saponified fatty acids may also be derived from any of the vegetable oils previously mentioned. The saponified fatty acids can be used without a buffering agent when they reduce the pH of the solution to about 7 or below. The saponified fatty acids can be used without a buffering agent when they reduce the pH to below about 7.

5. N,N dimethylamides of the Following Formula:

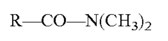

wherein R is an alkyl chain derived from fatty acids having about 6 to about 18 carbon atoms. The N,N dimethylamides can be present in an amount from about 1 to about 99%, preferably from about 50 to about 99% and most preferably from about 80 to about 99%.

6. Polybutenes:

The polybutenes that can be used are of the following formula

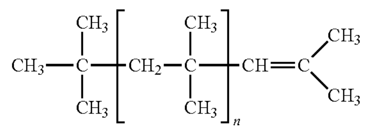

where n is a number from about 1 to about 50. The polybutenes can be present in an amount from about 1 to about 99%, preferably from about 50 to about 99% and most preferably from about 80 to about 99%.

7. α or β pinene.

8. Thymol.

9. d-limonene.

10. Jojoba bean oil.

11. Mixture of at least one of 1-10 above.

These 10 groups of oils can be a portion of the spray oil or the entire spray oil.

The preferred buffering agents include, but are not limited to, a) alkylaryl polyethoxy phosphate ester,
b) $C_1$-$C_6$ carboxylic acids,
c) $C_1$-$C_6$ dicarboxylic acids,
d) phosphoric acid,
e) citric acid,
f) glutaric acid,
g) gluconic acid,
h) lactic acid,
i) glycolic acid,
j) acrylic acid,
k) carboxylated alcohol ethoxylate, preferably of the formula

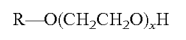

R is a carboxylic acid having from 1 to about 25 carbon atoms and x is from 1 to about 20 moles ethylene oxide,
l) ethoxylated alkylaryl phosphate esters;
m) ethoxylated alkylphenol carboxylate esters;
n) tristyrylphenol alkoxylate phosphate esters;
o) tristyrylphenol alkoxylate carboxylate esters;
p) fatty acids and blends thereof and
q) phosphate esters of block copolymers of ethylene and propylene oxide.

The following patents and reference, which include several ingredients that can be used according to this invention, are incorporated by reference in its entirety for all useful purposes:

U.S. Pat. No. 5,741,502 entitled Homogeneous, essentially nonaqueous adjuvant compositions with buffering capability U.S. Pat. No. 5,725,630 entitled Dry granular fertilizer blend and a method of fertilizing plants U.S. Pat. No. 5,580,567 entitled Homogeneous, essentially nonaqueous adjuvant compositions with buffering capability U.S. Pat. No. 5,393,791 entitled Homogeneous, essentially nonaqueous adjuvant compositions with buffering capability U.S. Pat. No. 5,234,919 entitled Water soluble, highly active dimethoate formulations in an alcohol/ester solvent system U.S. Pat. No. 5,178,795 entitled Homogeneous, essentially nonaqueous adjuvant compositions with buffering capability U.S. Pat. No. 5,906,961 entitled Alkanolamide spreader-sticker surfactant combination U.S. Pat. No. 5,877,112 entitled Agricultural formulation.

The composition can be used for plants such as, but not limited to grass crops, turf crops, cucurbit crops, *brassica* crops, solanaceae crops, bush berries, citrus, stone fruits, nuts or other crops.

Grass crops include but are not limited to barley, maize (corn), oats, rice, rye, sorghum, wheat, millet, sugar cane or bamboo.

Turf crops include but are not limited to Bermuda grass, St. Augustine grass, *Zoysia* grass, Kentucky bluegrass or Perennial ryegrass.

Cucurbit crops include but are not limited to pumpkin, squash, zucchini, cucumber, watermelon or gourd.

*Brassica* Crops include but are not limited to cabbage, cauliflower, broccoli, mustard, brussel sprouts, turnips/turnip greens, collards, kale or bok Choy.

Solanaceae crops include but are not limited to tomatoes, tomatillos, eggplant, potatoes, goji berries, tobacco, peppers (bell peppers, chili peppers, paprika, tamales, tomatillos, pimentos, cayenne, etc).

Bush berries, such as, but not limited to, strawberry, blueberry, blackberry, raspberry, mulberry, elderberry, red currants, white currants, and black currents.

Citrus, such as, but not limited to, citron, clementine, grapefruit, oranges, sudachi, shonan gold, satsuma, tangelo, tangerine, limetta, tangor, lemons, limes, citron, yuzu or ugli fruit.

Stone fruits, such as, but not limited to peaches, nectarines and plums would also work.

Nuts, such as, but not limited to peanut and almond would also work.

Other crops such as, but not limited to apples, avocado, mangos, lychee and olives.

As a herbicide, the inventive composition can be effective against at least the following: palmer amaranth, morning-glory, goosegrass, lambsquarter, crab grass, velvetleaf, giant foxtail, yellow foxtail, fall panicum, woolly cupgrass and broadleaf signalgrass.

As an insecticide, the inventive composition is effective against *thrips*, whiteflies such as but not limited to adult whitefly or nymph whitefly.

As a fungicide, the inventive composition can be used to protect against *botrytis*, and potentially against grey leaf spot, anthracnose, rust in corn; frogeye leaf spot, rust in soybean, and white mold in peanuts.

In addition, the inventive composition can be used as an adjuvant for enhancing herbicides, insecticides and fungicides.

It is possible that the inventive composition can be used as a herbicide, insecticide or fungicide without any additional ingredients.

The fertilizer can be ammonia sulfate, an ammonia salt of a carboxylic acid, mono- or di-potassium phosphate, a micronutrient, ammonia nitrate, urea, ammonia citrate or ammonia acetate. Optional components can be pH reducer, macronutrients and micronutrients.

Herbicide Efficacy

The following field trials were conducted to evaluate the invention with herbicides, fungicides, insecticides, defoliants, and plant growth regulators. The main objective of these trials were to compare HM 1041A, which contains AMADS, and HM 1895, which contains DAMALEX. HM 1041A is a product that is a unique herbicide activator, containing a blend of deposition agents, activators and water conditioners that enhances herbicide efficiency. HM 1041A improves spray deposition and uptake, while preventing antagonisms caused by poor water quality. HM 1041A contains citric acid, alkyl amine alkoxylate, alkyl alkoxylated phosphate, and AMADS.

A set of field trials were conducted to compare HM 1041A with HM 1895 to determine increased herbicide efficacy with glyphosate and 2,4-D Amine.

Design

Randomized Complete Block Design is a method of setting up field trials so the results may be statistically evaluated. Specifically, it is the statistical design of the experiment. RCBD is commonly used in agricultural experiments because the blocks can be adjusted for variation in the field. Each block serves as a replication and treatments are randomly applied to the plots within the block. Output System—

Burndown

15 GPA

110015 TTI nozzles

Replication four (4).

The plot size was 6.34 feet wide by 20 feet long. The results are described below and in FIGS. 1-5.

TABLE 1

| Trt No. | Type | Treatment Name | Form Conc | Form Unit | Form Type | Rate | Rate Unit | Appl Code | Appl Description |
|---|---|---|---|---|---|---|---|---|---|
| 1 | CHK | UNTREATED CHECK | | | | | | A | POSTWE |
| 2 | HERB | RODEO | 4 | LBA/GAL | SL | 16 | fl oz/a | A | POSTWE |
| 3 | HERB | RODEO | 4 | LBA/GAL | SL | 16 | fl oz/a | A | POSTWE |
| | ADJ | HM 1041A | | | L | 0.25 | % v/v | A | POSTWE |
| 4 | HERB | RODEO | 4 | LBA/GAL | SL | 16 | fl oz/a | A | POSTWE |
| | ADJ | HM 1895 | | | L | 0.25 | % v/v | A | POSTWE |
| 5 | HERB | WEED RHAP A-4D | 3.8 | LB/GAL | EC | 16 | fl oz/a | A | POSTWE |
| 6 | HERB | WEED RHAP A-4D | 3.8 | LB/GAL | EC | 16 | fl oz/a | A | POSTWE |
| | ADJ | HM 1041A | | | L | 0.25 | % v/v | A | POSTWE |
| 7 | HERB | WEED RHAP A-4D | 3.8 | LB/GAL | EC | 16 | fl oz/a | A | POSTWE |
| | ADJ | HM 1895 | | | L | 0.25 | % v/v | A | POSTWE |

The inventive composition can be used to improve defoliant and PGR efficacy in crops such as cotton.

The inventive composition can be added to a fertilizer. The fertilizer can be any fertilizer such as a fertilizer containing nitrogen, phosphorous and potassium, referred to as “NPK” or a fertilizer which does not contain any nitrogen referred to as a XPK. The fertilizer can contain boron, zinc, copper, iron, blends of nitrogen, phosphorous, potassium, or mixtures thereof.

These treatment tables are produced by the Agricultural Experiment Software, ARM. These column headings are common to all research protocols written in the software:

Trt No.=Treatment Number

Type=Type of treatment (i.e. Adjuvant, Herbicide, Insecticide, etc.)

Treatment Name=Brand name or code for treatment

Form Conc=Formulation Concentration of the Product

Form Unit=Formulation Unit for the concentration

Form Type=Formulation Type (Emulsifiable Concentrate, Liquid, etc.)

Rate=Rate in which the product was applied

Rate Unit=unit of the corresponding rate (fluid ounces per acre, etc.)

Appl Code=Code assigned for the timing of the application

Appl Description=Description of the timing in which the application should be made (i.e. Post Weed Emergence, etc.)

Visual control a. 0-100% scale, where 0=no reduction in green cover and 100=complete reduction in green cover, relative to the untreated check Assessed at 3, 7, 14, and 21 Days After Treatment (DAT)

The results are shown in FIGS. 1-5. The data shows that both HM 1041A and HM 1895 provided an increase in glyphosate efficacy and in 2,4-D efficacy when used on multiple weeds compared to no adjuvant used. Another field trial was conducted with the following parameters:

Design

Randomized Complete Block Design

Output System—

Burndown

15 GPA

110015 TTI nozzles

Replication four (4).

Figure 1:
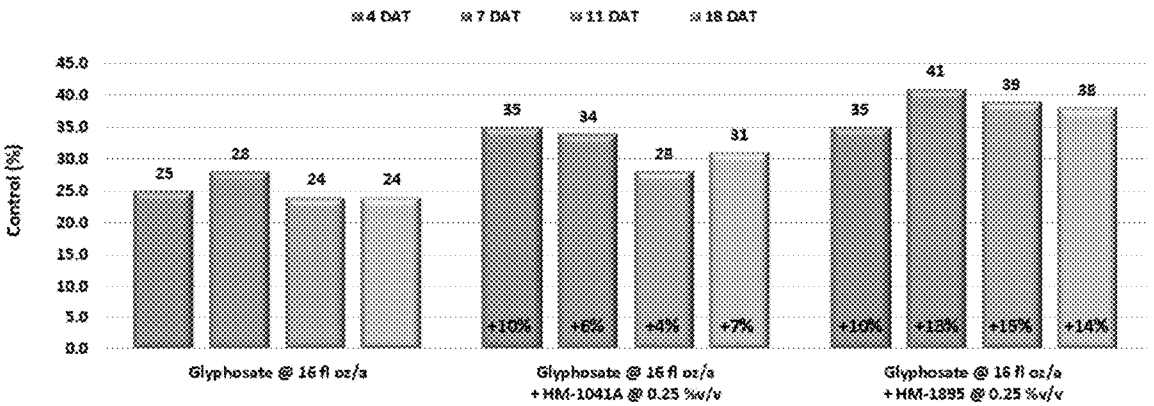
FIGS. 1-2 illustrate field trial information for Palmer amaranth Control
Figure 2:
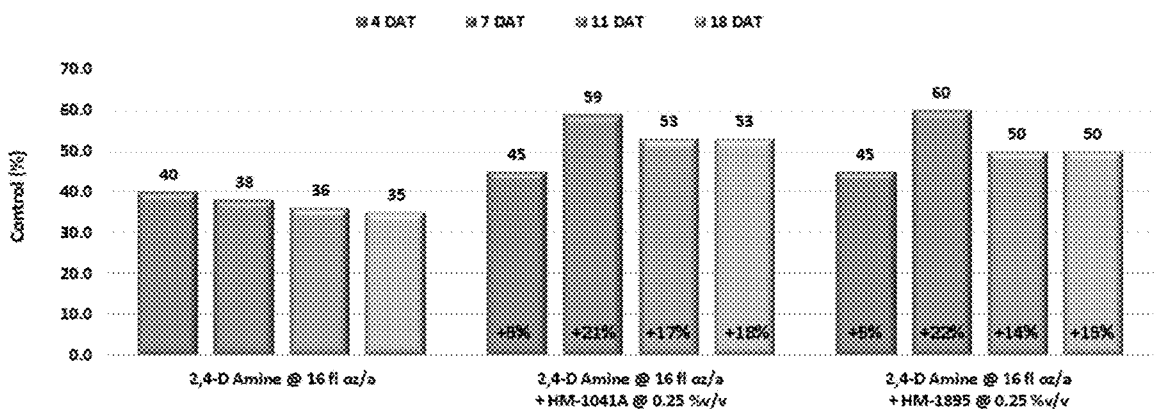
Figure 3:
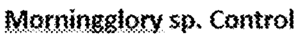
FIGS. 3-4 illustrate field trial information for Morning glory sp. Control
Figure 3:
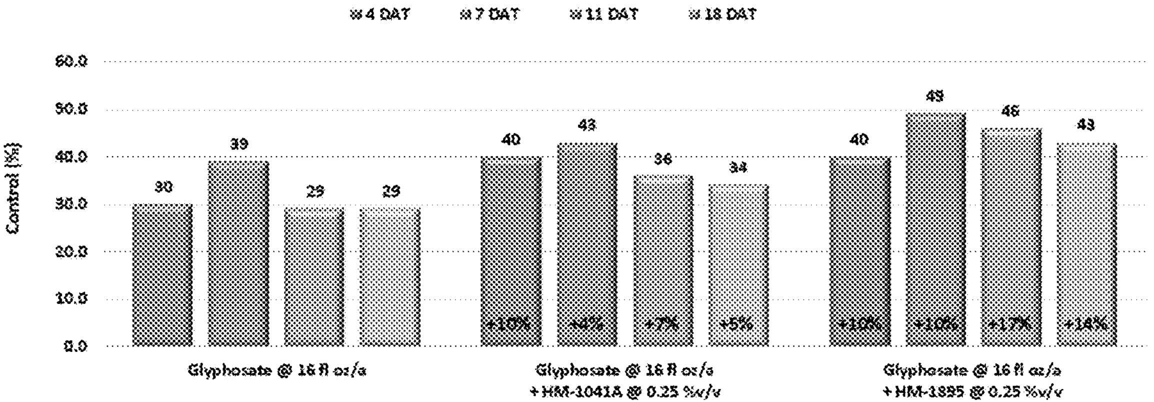
Figure 4:
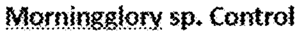
Figure 4:
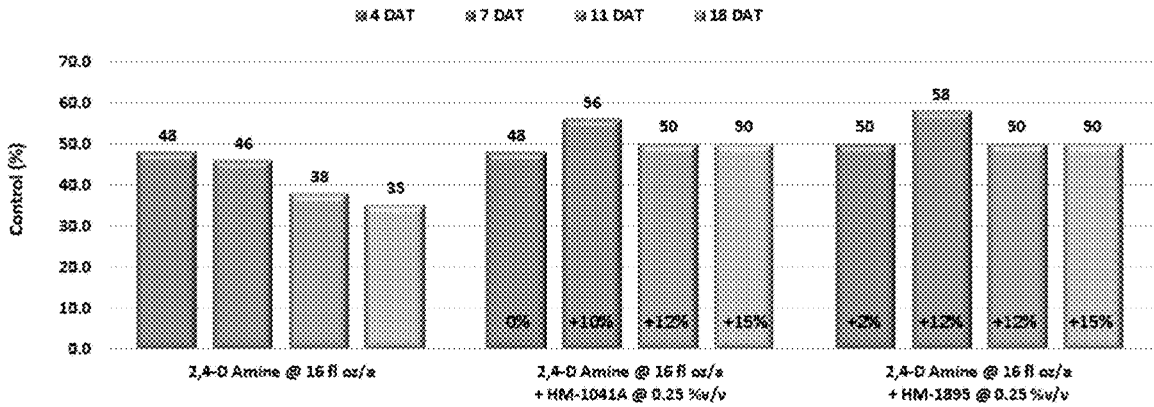
Figure 5:
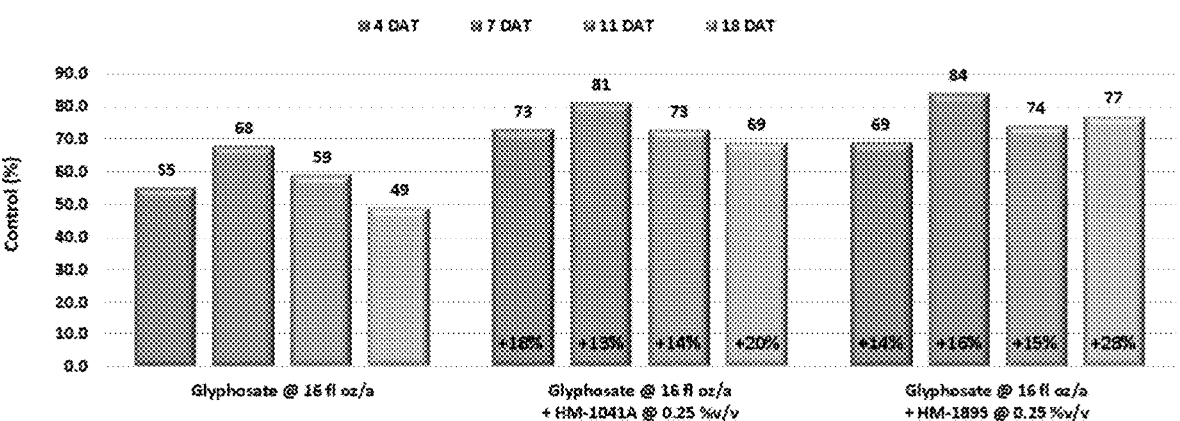
FIG. 5 illustrates field trial information for Goosegrass Control
Figure 6:
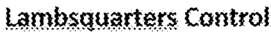
FIG. 6 illustrates field trial information for Lambsquarters Control
Figure 6:
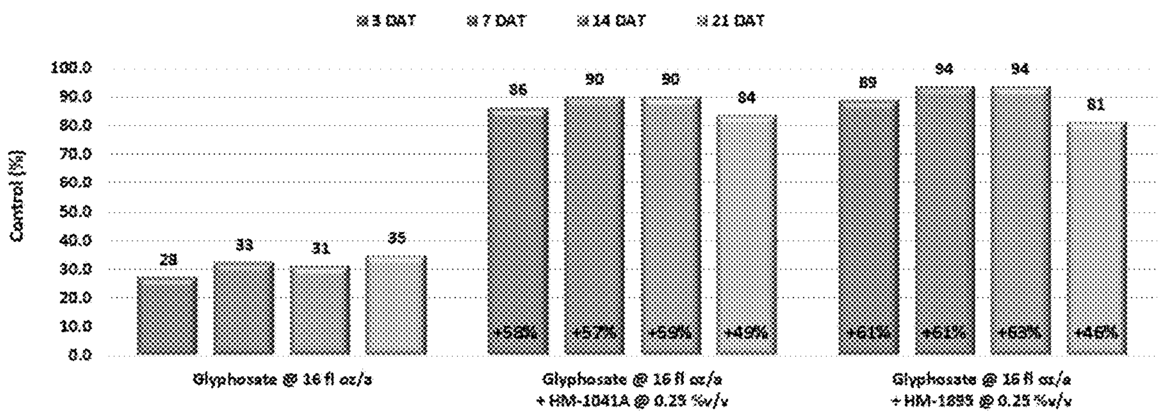
Figure 7:
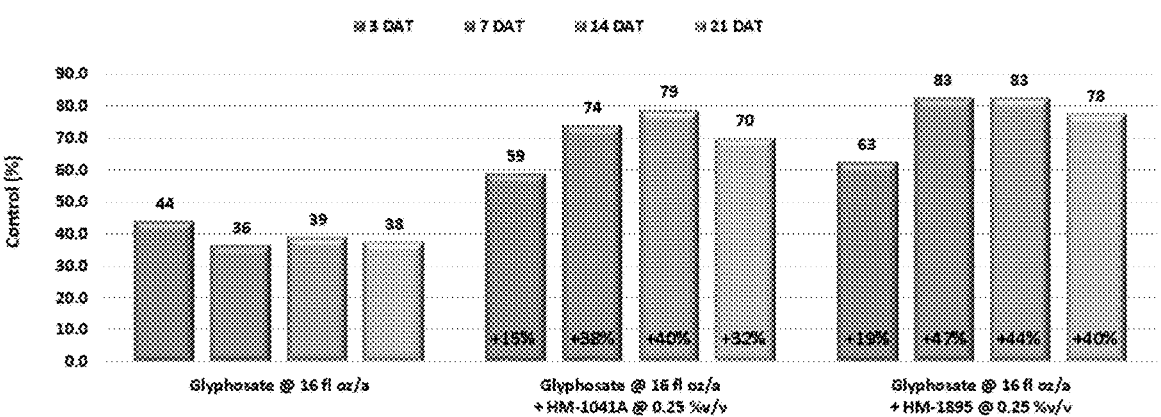
FIGS. 7 and 9 illustrate field trial information for Velvetleaf Control
Figure 8:
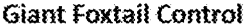
FIG. 8 illustrates field trial information for Giant Foxtail Control
Figure 8:
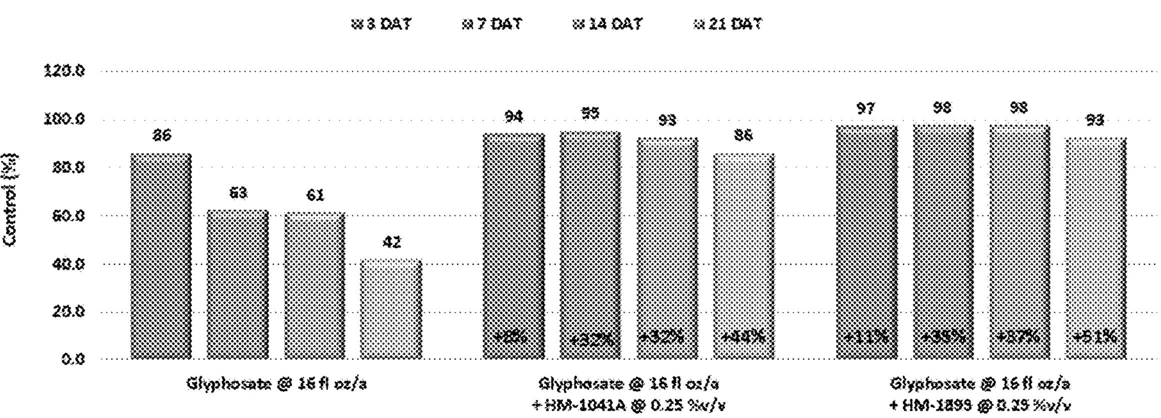
Figure 9:
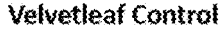
Figure 9:
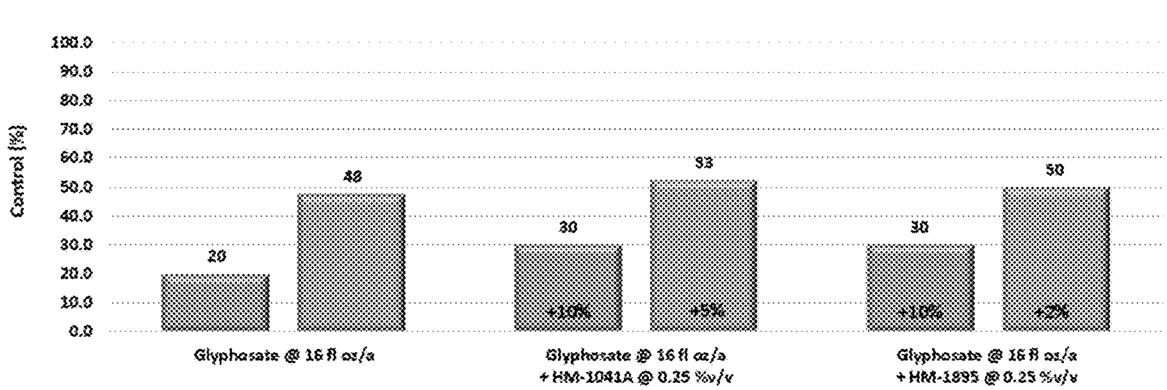

The plot size was 13.1 feet wide by 19.7 feet long. The results are shown in FIGS. 6-8. The data shows that both HM 1041A and HM 1895 provided an increase in glyphosate efficacy when used on multiple weeds compared to no adjuvant used.

Another field trial was conducted with the following parameters:

Design

Randomized Complete Block Design

Output System—

Burndown

15 GPA

110015 TTI nozzles

Replication four (4).

The plot size was 10 feet wide by 27.5 feet long. The results are shown in FIGS. 9-12. The data shows that both HM 1041A and HM 1895 provided an increase in glyphosate efficacy when used on multiple weeds compared to no adjuvant used.

Insecticide Efficacy

A field trial was conducted to see compare HM 1895 and HM 1041A for improved insecticide efficacy with the following parameters:

Data Collection

Insect Counts of *Thrips* per 25 flowers

Phytotoxicity 0-100% rating

Final Yield

None required

TABLE 2

| Trt No. | Type | Treatment Name | Form Conc | Form Unit | Form Type | Rate | Rate Unit | Appl Code |
|---|---|---|---|---|---|---|---|---|
| 1 | CHK | UNTREATED CHECK | | | | | | |

TABLE 2-continued

| Trt No. | Type | Treatment Name | Form Conc | Form Unit | Form Type | Rate | Rate Unit | Appl Code |
|---|---|---|---|---|---|---|---|---|
| 2 | INSE | RADIANT | 1 | LBA/GAL | SC | 5 | fl oz/a | A |
| 3 | INSE | RADIANT | 1 | LBA/GAL | SC | 5 | fl oz/a | A |
| | ADJ | HM 1895 | 100 | % | L | 0.25 | % v/v | A |
| 4 | INSE | RADIANT | 1 | LBA/GAL | SC | 5 | fl oz/a | A |
| | ADJ | HM 1895 | 100 | % | L | 1 | % v/v | A |
| 5 | INSE | RADIANT | 1 | LBA/GAL | SC | 5 | fl oz/a | A |
| | ADJ | HM 1041A | 100 | % | L | 0.25 | % v/v | A |
| 6 | INSE | RADIANT | 1 | LBA/GAL | SC | 5 | fl oz/a | A |
| | ADJ | HM 1041A | 100 | % | L | 1 | % v/v | A |

Trial Information

Crop: Bell Peppers

Design

Randomized Complete Block Design

Output System

Pest Threshold

30 GPA

TTJ11002 & TJ8003 nozzles

Replication Four (4)

Plot Size is 3.5 feet wide by 30 feet long

FIG. 13 shows:

1. Both adjuvants provided an increase in insecticide efficacy in immature thrips control.

2. Increasing the rate of adjuvants increased the efficacy of the insecticide against immature thrips in bell pepper.

3. No phytotoxicity resulted from insecticide and adjuvant applications.

A field trial was conducted to compare HM 1041A and HM 1895 for increased insecticide efficacy with acetamiprid (Assail 30 DG).

Visual control

Pest Density using an appropriate rating method

Assessed at 3, 7, 10, and 14 DAT and recorded as a season total.

Crop Pytotoxicity 0-100% scale

Treatment Information

TABLE 3

| Trt No. | Type | Treatment Name | Form Conc | Form Unit | Form Type | Rate | Rate Unit | Appl Code |
|---|---|---|---|---|---|---|---|---|
| 1 | CHK | UNTREATED CHECK | | | | | | A |
| 2 | INS | ASSAIL | 30 | % | DG | 2.0 | oz wt/a | A |
| 3 | INS | ASSAIL | 30 | % | DG | 2.0 | oz wt/a | A |
| | ADJ | HM 1895 | | | L | 0.25 | % v/v | A |
| 4 | INS | ASSAIL | 30 | % | DG | 2.0 | oz wt/a | A |
| | ADJ | HM 1041A | | | L | 0.25 | % v/v | A |

Trial Information

Design

Randomized Complete Block Design

Output System

30 GPA

TJ3 D3/25 nozzles

Replication Four (4)

The plot size was 7 feet wide by 20 feet long.

FIGS. 14 and 15 show

1. Both adjuvants provided an increase in insecticide efficacy in adult and immature whitefly control and 2. No phytotoxicity resulted from insecticide and adjuvant applications.

Fungicide Efficacy

A field trial was conducted to compare HM 1895 to HM 1041A for improved fungicide efficacy.

Treatment Information

TABLE 4

| Trt No. | Type | Treatment Name | Rate | Rate Unit | Appl Code |
|---|---|---|---|---|---|
| 1 | CHK | UNTREATED CHECK | | | AB |
| 2 | FUNG | CAPTAN | 1.87 | lb/a | AB |
| 3 | FUNG | CAPTAN | 1.87 | lb/a | AB |
| | ADJ | HM 1895 | 0.25 | % v/v | AB |
| 4 | FUNG | CAPTAN | 1.87 | lb/a | AB |
| | ADJ | HM 1895 | 1 | % v/v | AB |
| 5 | FUNG | CAPTAN | 1.87 | lb/a | AB |
| | ADJ | HM 1041A | 0.25 | % v/v | AB |
| 6 | FUNG | CAPTAN | 1.87 | lb/a | AB |
| | ADJ | HM 1041A | 1 | % v/v | AB |

Trial Information
- Crop: Strawberry
- Design
  - Randomized Complete Block Design
- Output System
  - Foliar
  - 40 GPA
  - Replication three (3).
- Plot Size is 3 ft×25 ft Data Collection
- Crop Phytotoxicity
  - 0-100 where 0=no phytotoxicity and 100=complete necrosis
  - Percent Infested Fruit
    - 20 strawberries from each plot were placed in containers for *Botrytis* development after fungicide application and were rated for the percent of fruit infected from each plot at specific dates.

The fruit were evaluated 7 days after the first application, 5 days after the second application, and 9 days after the second application FIGS. 16 through 18 show:

1. Both adjuvants provided an increase in fungicide efficacy against *Botrytis*.
2. Adjuvant rate did not affect efficacy against *Botrytis*.
3. No phytotoxicity resulted from fungicide and adjuvant applications.

Defoliant and PGR Efficiency

A field trial was conducted to compare HM 1895 and HM 1041A for Improved Cotton defoliant and PGR efficacy.

TABLE 5

| Trt No. | Type | Treatment Name | Rate | Rate Unit | Application Code |
|---|---|---|---|---|---|
| 1 | CHK | UNTREATED CHECK | | | A |
| 2 | HERB | GINSTAR | 7 | fl oz/ac | A |
| 3 | HERB | GINSTAR | 7 | fl oz/ac | A |
| | ADJ | HM 1895 | 0.25 | % v/v | A |
| 4 | HERB | GINSTAR | 7 | fl oz/ac | A |
| | ADJ | HM 1041A | 0.25 | % v/v | A |
| 5 | HERB | GRAMOXONE | 5.5 | fl oz/ac | A |
| 6 | HERB | GRAMOXONE | 5.5 | fl oz/ac | A |
| | ADJ | HM 1895 | 0.25 | % v/v | A |
| 7 | HERB | GRAMOXONE | 5.5 | fl oz/ac | A |
| | ADJ | HM 1041A | 0.25 | % v/v | A |
| 8 | HERB | GRAMOXONE | 5.5 | fl oz/ac | A |
| | HERB | ET | 1.5 | fl oz/ac | A |

TABLE 5-continued

| Trt No. | Type | Treatment Name | Rate | Rate Unit | Application Code |
|---|---|---|---|---|---|
| 9 | HERB | GRAMOXONE | 5.5 | fl oz/ac | A |
| | HERB | ET | 1.5 | fl oz/ac | A |
| | ADJ | HM 1895 | 0.25 | % v/v | A |
| 10 | HERB | GRAMOXONE | 5.5 | fl oz/ac | A |
| | HERB | ET | 1.5 | fl oz/ac | A |
| | ADJ | HM 1041A | 0.25 | % v/v | A |

ADJ—Adjuvant
HERB—Herbicide

Trial Information
- Crop: Cotton
- Design
  - Randomized Complete Block Design
- Output System
  - 20 GPA
- Replication
  - Four (4)
- Plot Size
  - 7 feet wide by 50 feet long Data Collection
- Percent Open Bolls
  - 5, 10, 15, and 20 DA-A
- Percent Defoliation
  - 20 and 30 DA-A FIGS. 18-23 show:

1. HM 1895 and HM 1041A increased open bolls with Ginstar, Gramoxone, and Gramoxone+ET.
2. HM 1895 and HM 1041A increased percent defoliation with Ginstar and Gramoxone.

Safety with Different Pesticide Types

Another field trial was conducted to evaluate the crop safety of HM 1895 and HM 1041A with different pesticides.

Trial Information
- Crop: garden radish (*Raphanus sativus* var. *niger*)
- Design
  - Randomized Complete Block Design
- Output System
  - Foliar preplant burndown
  - 15 GPA
  - 110015 flat fan nozzles
- Replication
  - Four (4)
- Plot Size
  - 1 pot

TABLE 6

| Trt No. | Type | Treatment Name | Rate | Rate Unit | Appl Code |
|---|---|---|---|---|---|
| 1 | CHK | UNTREATED CHECK | | | A |
| 2 | HERB | SELECT MAX | 16 | fl oz/a | A |
| 3 | HERB | SELECT MAX | 16 | fl oz/a | A |
| | ADJ | HM 1895 | 0.25 | % v/v | A |
| 4 | HERB | SELECT MAX | 16 | fl oz/a | A |
| | ADJ | HM 1895 | 0.5 | % v/v | A |
| 5 | HERB | SELECT MAX | 16 | fl oz/a | A |
| | ADJ | HM 1895 | 1 | % v/v | A |
| 6 | HERB | SELECT MAX | 16 | fl oz/a | A |
| | ADJ | HM 1041A | 0.25 | % v/v | A |
| 7 | HERB | SELECT MAX | 16 | fl oz/a | A |
| | ADJ | HM 1041A | 0.5 | % v/v | A |
| 8 | HERB | SELECT MAX | 16 | fl oz/a | A |
| | ADJ | HM 1041A | 1 | % v/v | A |

TABLE 6-continued

| Trt No. | Type | Treatment Name | Rate | Rate Unit | Appl Code |
|---|---|---|---|---|---|
| 9 | INSE | BAYTHROID XL | 2.8 | fl oz/a | A |
| 10 | INSE | BAYTHROID XL | 2.8 | fl oz/a | A |
| 11 | INSE | BAYTHROID XL | 2.8 | fl oz/a | A |
| | ADJ | HM 1895 | 0.5 | % v/v | A |
| 12 | INSE | BAYTHROID XL | 2.8 | fl oz/a | A |
| | ADJ | HM 1895 | 1 | % v/v | A |
| 13 | INSE | BAYTHROID XL | 2.8 | fl oz/a | A |
| | ADJ | HM 1041A | 0.25 | % v/v | A |
| 14 | INSE | BAYTHROID XL | 2.8 | fl oz/a | A |
| | ADJ | HM 1041A | 0.5 | % v/v | A |
| 15 | INSE | BAYTHROID XL | 2.8 | fl oz/a | A |
| | ADJ | HM 1041A | 1 | % v/v | A |
| 16 | FUNG | QUADRIS | 15.5 | fl oz/a | A |
| 17 | FUNG | QUADRIS | 15.5 | fl oz/a | A |
| | ADJ | HM 1895 | 0.25 | % v/v | A |
| 18 | FUNG | QUADRIS | 15.5 | fl oz/a | A |
| | ADJ | HM 1895 | 0.5 | % v/v | A |
| 19 | FUNG | QUADRIS | 15.5 | fl oz/a | A |
| | ADJ | HM 1895 | 1 | % v/v | A |
| 20 | FUNG | QUADRIS | 15.5 | fl oz/a | A |
| | ADJ | HM 1041A | 0.25 | % v/v | A |
| 21 | FUNG | QUADRIS | 15.5 | fl oz/a | A |
| | ADJ | HM 1041A | 0.5 | % v/v | A |
| 22 | FUNG | QUADRIS | 15.5 | fl oz/a | A |
| | ADJ | HM 1041A | 1 | % v/v | A |

TABLE 7

| Trt No. | Type | Treatment Name | Rate | Rate Unit | 1DA-A | 2DA-A | 5DA-A | 7DA-A | 15DA-A | 21DA-A | 28DA-A |
|---|---|---|---|---|---|---|---|---|---|---|---|
| 1 | CHK | UNTREATED CHECK | | | 0 | 0 | 0 | 0 | 0 | 0 | 0 |
| 2 | HERB | SELECT MAX | 16 | fl oz/a | 0 | 0 | 0 | 0 | 0 | 0 | 0 |
| 3 | HERB | SELECT MAX | 16 | fl oz/a | 0 | 0 | 0 | 0 | 0 | 0 | 0 |
| | ADJ | HM 1895 | 0.25 | % v/v | | | | | | | |
| 4 | HERB | SELECT MAX | 16 | fl oz/a | 0 | 0 | 0 | 0 | 0 | 0 | 0 |
| | ADJ | HM 1895 | 0.5 | % v/v | | | | | | | |
| 5 | HERB | SELECT MAX | 16 | fl oz/a | 0 | 0 | 0 | 0 | 0 | 0 | 0 |
| | ADJ | HM 1895 | 1 | % v/v | | | | | | | |
| 6 | HERB | SELECT MAX | 16 | fl oz/a | 0 | 0 | 0 | 0 | 0 | 0 | 0 |
| | ADJ | HM 1041A | 0.25 | % v/v | | | | | | | |
| 7 | HERB | SELECT MAX | 16 | fl oz/a | 0 | 0 | 0 | 0 | 0 | 0 | 0 |
| | ADJ | HM 1041A | 0.5 | % v/v | | | | | | | |
| 8 | HERB | SELECT MAX | 16 | fl oz/a | 0 | 0 | 0 | 0 | 0 | 0 | 0 |
| | ADJ | HM 1041A | 1 | % v/v | | | | | | | |
| 9 | INSE | BAYTHROID XL | 2.8 | fl oz/a | 0 | 0 | 0 | 0 | 0 | 0 | 0 |
| 10 | INSE | BAYTHROID XL | 2.8 | fl oz/a | 0 | 0 | 0 | 0 | 0 | 0 | 0 |
| | ADJ | HM 1895 | 0.25 | % v/v | | | | | | | |
| 11 | INSE | BAYTHROID XL | 2.8 | fl oz/a | 0 | 0 | 0 | 0 | 0 | 0 | 0 |
| | ADJ | HM 1895 | 0.5 | % v/v | | | | | | | |
| 12 | INSE | BAYTHROID XL | 2.8 | fl oz/a | 0 | 0 | 0 | 0 | 0 | 0 | 0 |
| | ADJ | HM 1895 | 1 | % v/v | 0 | 0 | 0 | 0 | 0 | 0 | 0 |
| 13 | INSE | BAYTHROID XL | 2.8 | fl oz/a | 0 | 0 | 0 | 0 | 0 | 0 | 0 |
| | ADJ | HM 1041A | 0.25 | % v/v | | | | | | | |
| 14 | INSE | BAYTHROID XL | 2.8 | fl oz/a | 0 | 0 | 0 | 0 | 0 | 0 | 0 |
| | ADJ | HM 1041A | 0.5 | % v/v | | | | | | | |
| 15 | INSE | BAYTHROID XL | 2.8 | fl oz/a | 0 | 0 | 0 | 0 | 0 | 0 | 0 |
| | ADJ | HM 1041A | 1 | % v/v | | | | | | | |
| 16 | FUNG | QUADRIS | 15.5 | fl oz/a | 0 | 0 | 0 | 0 | 0 | 0 | 0 |
| 17 | FUNG | QUADRIS | 15.5 | fl oz/a | | | | | | | |
| | ADJ | HM 1895 | 0.25 | % v/v | 0 | 0 | 0 | 0 | 0 | 0 | 0 |
| 18 | FUNG | QUADRIS | 15.5 | fl oz/a | | | | | | | |
| | ADJ | HM 1895 | 0.5 | % v/v | 0 | 0 | 0 | 0 | 0 | 0 | 0 |
| 19 | FUNG | QUADRIS | 15.5 | fl oz/a | | | | | | | |
| | ADJ | HM 1895 | 1 | % v/v | 0 | 0 | 0 | 0 | 0 | 0 | 0 |
| 20 | FUNG | QUADRIS | 15.5 | fl oz/a | 0 | 0 | 0 | 0 | 0 | 0 | 0 |
| | ADJ | HM 1041A | 0.25 | % v/v | 0 | 0 | 0 | 0 | 0 | 0 | 0 |

SUMMARY

HM 1041A and HM 1895 were each applied at multiple rates with a fungicide, insecticide, and herbicide to evaluate potential crop injury. Radishes are a sensitive crop, and spraying pesticides in a greenhouse setting can increase the risks of phytotoxic effects. In this setting, HM 1041A and HM 1895 did not cause any phytotoxicity to the radishes when sprayed at the rates of 0.25, 0.5, and 1% v/v with SelectMax, Baythroid XL, and Quadris. These results suggest that HM 1041A and HM 1895 would be safe to applywith labeled rates of herbicides, insecticides, and fungicides in commercial field settings.

It is noted that HM 1041A is not as easy to handle as the inventive composition. HM 1041A has the following disadvantages. On the SDS of HM 1041A, it is stated that it can cause skin and eye irritation and maybe harmful is swallowed. It is recommended on the SDS to wear protective equipment, chemical-resistant gloves, ling-sleeved shirt and long pants, shoes plus socks when mixing or applying. This is not a requirement with our inventive composition.

Experimental field trials of this composition have also shown superior enhancements of pesticide efficacy over traditional spray adjuvants.

Corrosion Potential

Test batches of DAMALEX and AMADS were made without corrosion inhibitors at a molar ratio of 1.05:1.00 diaminomethanal to acid and diluted to 85% by weight with water. Diaminomethanal is slightly in excess to eliminate the possibility of corrosion by free acid. A molar ratio rather than weight % was used to account for the difference in molar mass between carboxylic and sulfuric acids. Throughout test batch formulation, the exothermic AMADS reaction was kept below 65° C. by adding ingredients slowly with the mixing beaker in an ice bath. In contrast, the DAMALEX reaction is not exothermic, so heat was added to a maximum temperature of 48° C. to aid in dissolving of diaminomethanal. This indicates that DAMALEX would be safer and possibly quicker to manufacture than AMADS.

Corrosion testing was performed by a modified ASTM G 31-72 Standard Practice for Laboratory Immersion Corrosion Testing of Metals (2004). Test batches were prepared in separate sealed vessels with standardized, pre-weighed metal coupons partially submerged to create vapor, interface, and submerged phases between the solid metal and liquid test materials. Test batches were held at constant elevated temperatures between 45° C. and 46° C. for 168 hours. At the end of testing duration, metal coupons were removed from liquid test material, visually inspected, cleaned with water and gentle scrubbing, visually inspected a second time, and weighed back for mass loss. Corrosion rate was calculated as inches per year by the following formula:

$$\frac{\text{inches}}{\text{year}} = \frac{(K \times W)}{(A \times T \times D)}$$

Where:

K=in/yr Constant=3450

W=Mass Loss (grams)

A=Initial Surface Area ($cm^2$)

T=Time of Exposure (hours)

D=Density ($g/cm^2$)

TABLE 8

| Product Tested | Material Tested | Corrosion Rate (in/yr) |
|---|---|---|
| DAMALEX | Stainless Steel 304 | 0.0001 |
| AMADS | Stainless Steel 304 | 0.0090 |
| DAMALEX | Aluminum | 0.0041 |
| AMADS | Aluminum | 0.1947 |
| DAMALEX | Mild Steel C1020 | 0.1204 |
| AMADS | Mild Steel C1020 | 0.0078 |

SUMMARY

As shown in Table 8, DAMALEX performed better than AMADS on Aluminum and Stainless Steel 304.

All ranges disclosed herein are inclusive of the endpoints, and the endpoints are independently combinable with each other (e.g., ranges of "10% to 90%, is inclusive of the endpoints and all intermediate values of the ranges of "10 to 90" etc.). Also included is the decimal such as 10 to 11 would include 10.1, 10.2, 10.3, 10.4, 10.5, 10.6, 10.7, 10.8, 10.9 and 11. "Combination" is inclusive of blends, mixtures, alloys, reaction products, and the like. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

All the references described above are incorporated by reference for all useful purposes.

We claim:

1. A spray adjuvant composition comprising a composition consisting essentially of water and diaminomethanal complexes with $C_1$ to $C_3$ carboxylic acids wherein the concentration of carboxylic acid is from 30%-20% by weight based on the combination of carboxylic acid and diaminomethanal and the concentration of diaminomethanal is from 70%-80% by weight based on the combination of carboxylic acid and diaminomethanal and a fatty amine alkoxylate surfactant present in an amount from 5 to 50% by weight and wherein the fatty amine alkoxylate surfactant is selected from the formula:

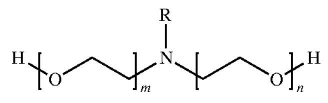

wherein R is an alkyl group containing from 8 to 22 carbon atoms and moles of alkoxylation (m+n) are 5-20.

2. The composition as claimed in claim 1, which further comprises a corrosion inhibitor.

3. The composition as claimed in claim 1, wherein the carboxylic acid is $C_2$ carboxylic acid.

4. The composition as claimed in claim 1, wherein the composition does not contain a plant regulator.

5. The spray adjuvant of claim 1, further comprising at least one component selected from the group consisting of:

(a) vegetable oils, (b) fatty acids and blends thereof, (c) esterified fatty acids or blends thereof, (d) saponified fatty acids or blends thereof, (e) N,N-dimethylamide of the formula

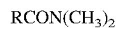

$RCON(CH_3)_2$ wherein R is an alkyl chain derived from fatty acids having about 6 to about 18 carbon atoms, (f) polybutenes of the following formula

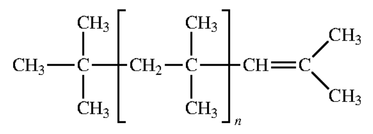

where n is a number from about 1 to about 50, (g) spray oils having a UR value from about 85% to 100%, and (h) buffering agents.

6. The spray adjuvant as claimed in claim 5, comprising at least one component (a)-(g) and a surfactant in an effective amount to provide emulsification of said composition and optionally a buffering agent in an amount sufficient to reduce the pH to below about 7.

7. The spray adjuvant according to claim 1, wherein the surfactant is present in an effective amount to provide emulsification of said composition and optionally a buffering agent in an amount sufficient to reduce the pH to below about 7.

8. The spray adjuvant as claimed in claim 1, wherein the surfactant is present in an amount from 5 to 20% by weight.

9. A composition consisting essentially of water and diaminomethanal complexes with $C_1$ to $C_3$ carboxylic acids wherein the concentration of carboxylic acid is from 30%-20% by weight based on the combination of carboxylic acid and diaminomethanal, and the concentration of diaminomethanal is from 70-80% by weight based on the combination of carboxylic acid and diaminomethanal, and a corrosion inhibitor and wherein the composition does not contain a plant regulator.

10. The composition as claimed in claim 9, which further requires at least one of the following ingredients:

(a) a surfactant, (b) a pH reducer, (c) a buffer, or (d) a viscosity modifier.

11. The composition as claimed in claim 9, which further contains a surfactant.

12. The composition as claimed in claim 11, wherein the surfactant is present in an amount from 5 to 50% by weight.

13. The composition as claimed in claim 11, wherein the surfactant is present in an amount from 5 to 20% by weight.

14. The composition as claimed in claim 11, wherein the surfactant is a fatty amine alkoxylate.

15. The composition as claimed in claim 11, wherein the surfactant is a fatty amine alkoxylate selected from the formula:

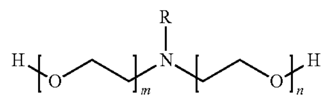

wherein R is an alkyl group containing from 8 to 22 carbon atoms and moles of alkoxylation (m+n) are 5-20.

16. A process to treat a plant which comprises applying the composition as claimed in claim 1 to the soil surrounding the plant or a seed of the plant.

17. The process as claimed in claim 16, wherein the solution is applied by spraying.

18. The process as claimed in claim 16, wherein the solution is applied at a rate of about 1-100 grams per acre of diaminomethanal complexes with $C_1$ to $C_3$ carboxylic acids.

19. A process to treat a plant which comprises applying the composition as claimed in claim 1 to the plant's surface.

* * * * *